US006968023B2

(12) United States Patent
Aoyama et al.

(10) Patent No.: US 6,968,023 B2
(45) Date of Patent: Nov. 22, 2005

(54) INTERFERENCE SIGNAL CANCELING APPARATUS AND INTERFERENCE SIGNAL CANCELING METHOD

(75) Inventors: Takahisa Aoyama, Yokosuka (JP); Kazuyuki Miya, Kawasaki (JP); Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 748 days.

(21) Appl. No.: 09/936,430

(22) PCT Filed: Jan. 12, 2001

(86) PCT No.: PCT/JP01/00118

§ 371 (c)(1),
(2), (4) Date: Sep. 13, 2001

(87) PCT Pub. No.: WO01/54327

PCT Pub. Date: Jul. 26, 2001

(65) Prior Publication Data

US 2002/0159549 A1 Oct. 31, 2002

(30) Foreign Application Priority Data

Jan. 18, 2000 (JP) ............................ 2000-008973

(51) Int. Cl.[7] ................................................ H03D 1/04
(52) U.S. Cl. ...................... 375/346; 375/340; 375/341; 375/200
(58) Field of Search ............................... 375/340, 346, 375/341, 368, 200

(56) References Cited

U.S. PATENT DOCUMENTS 5,224,122 A 6/1993 Bruckert
5,787,130 A 7/1998 Kotzin et al.
5,953,378 A * 9/1999 Hotani et al. ............... 375/341
6,002,727 A * 12/1999 Uesugi ....................... 375/346

FOREIGN PATENT DOCUMENTS

| | | |
|---|---|---|
| EP | 0776105 A1 | 5/1997 |
| JP | 10126383 | 5/1998 |
| JP | 11266184 | 9/1999 |
| JP | 2000295200 | 10/2000 |

OTHER PUBLICATIONS

H. Chen, et al.; "A Novel CDMA Multiuser Detector with Immunity Against Decision Error Propagation", Vehicular Technology Conference, 1997, IEEE 47th Phoenix, AZ, USA May 4-7, 1997, New York, NY, USA, IEEE, US, May 4, 1997, pp. 567-571, XP010228906, ISBN: 0-7803-3659-3.

(Continued)

*Primary Examiner*—Stephen Chin
*Assistant Examiner*—Jaison Joseph
(74) *Attorney, Agent, or Firm*—Stevens, Davis, Miller & Mosher, LLP

(57) ABSTRACT

Respective threshold value judging units 108-1 through **108-*n* compare the likelihoods calculated by the corresponding likelihood calculators 106-1 through 106-*n* with threshold values stored in a threshold value buffer 109 in terms of size, and output signals, which show the corresponding likelihood in only a case where the likelihood is the threshold value or more, through a likelihood transmission bus 110. The rank decision unit 112 ranks the symbols for which the likelihood is an appointed threshold value or more, on the basis of the likelihoods stored in the likelihood buffer 111**, whereby it is possible to relieve the traffic of a bus line and to suppress the amount of processing in a ranking process with respect to all non-demodulated symbols.

6 Claims, 4 Drawing Sheets

OTHER PUBLICATIONS

R. Fantacci, et al.; "One-Shot Multi-User Cancellation Receiver for Wireless CDMA Communication Systems" VTC 1999-Fall., IEEE VTS 50th, Vehicular Technology Conference, Gateway to the 21st Century Communications Village, Amsterdam, Sep. 19-22, 1999, IEEE Vehicular Technology Conference, New York, NY: IEEE, US, vol. 2, Conf. 50, Sep. 1999, pp. 1134-1138, XP000924688, ISBN: 0-7803-5436-2.

Mitsauru Uesugi, et al. "A Study about an interference Canceller for Uplink Siganl of CDMA System", Technical research report of the Institute of Electronics, Information and Communication Engineers, vol. 96, No. 481, RCS96-121, Jan. 23, 1997, pp. 51-56.

* cited by examiner

USER #1 1 2 3 4 5 6 7 8 9 10

USER #2 1 2 3 4 5 6 7 8 9 10

USER #3 1 2 3 4 5 6 7 8 9 10

USER #4 1 2 3 4 5 6 7 8 9 10

FIG. 2

INTERFERENCE SIGNAL CANCELING APPARATUS AND INTERFERENCE SIGNAL CANCELING METHOD

DESCRIPTION

1. Technical Field

The present invention relates to an interference signal canceling apparatus and an interference signal canceling method, which are incorporated in a base station, etc., of the CDMA mobile communication system.

2. Background Art

Recently, in a mobile communication system whose demand has been remarkably increasing, it is an important factor to attempt an increase in the capacity of communication channels. And, the CDMA system has been noted as a multiple division system that can increase the capacity of the channels.

Herein, a plurality of user signals are transmitted in the same frequency band in the CDMA system, where it is possible to completely separate signals of respective users from other user signals unless spreading codes of the respective user signals are orthogonal to each other. Further, even if the spreading codes of the respective user signals are orthogonal to each other, interference occurs where the time correlation is not zero.

In order to further increase the capacity in channels, it is important to improve the quality by canceling the interference from appointed user signals that are received by a receiver apparatus. As in the past, there has been an apparatus, which has been disclosed by Japanese Unexamined Patent Application No. 126383 of 1998, as an interference signal canceling apparatus for canceling interference.

With the interference signal canceling apparatus, first, received signals are used as input signals, wherein a detection process is carried out with respect to all symbols existing in a unit range (for example, one slot range) of the input signals, and the probability is calculated per symbol after the detection process is completed.

And, the interference signal canceling apparatus ranks all non-demodulated symbols on the basis of the size of the calculated probability (hereinafter, a process for ranking all symbols existing in the input signals is called a "ranking process"), wherein the symbol having the highest probability is demodulated, and a replica symbol of the symbol is generated, and the replica signal is subtracted from the input signal to make it into a new input signal.

Hereinafter, a series of interference signal canceling processes are repeated, wherein a detection process and a ranking process are carried out for all symbols existing in the input signal, and the symbol having the highest probability is demodulated, at the same time, a replica signal of the symbols is generated, and a new input signal is produced by subtracting the replica signal from the received signal.

Thus, with the above-described prior art interference signal canceling apparatus, by carrying out a ranking process in a state where influences of interference due to demodulated symbols are eliminated, the capacity of channels is increased by improving the quality.

However, in the above-described prior art interference signal canceling apparatus, where the number of users is increased and the transmission rate is increased, there are problems in that the traffic in bus lines is made heavy or the amount of processing in a ranking process will be remarkably increased.

DISCLOSURE OF THE INVENTION

It is therefore an object of the invention to provide an interference signal canceling apparatus and an interference signal canceling method, that is able to relieve the traffic in bus lines and suppress the amount of processing in a ranking process wherein the number of users is increased and the transmission rate is increased.

The object can be achieved by judging the size of the probability of the respective symbols and an appointed threshold value and carrying out a ranking process for only a symbol whose probability is an appointed threshold value or more.

BRIEF DESCRIPTION OF THE DRAWINGS

FIG. 2 is a view explaining a judgement of threshold values in the interference signal canceling apparatus according to the first embodiment of the invention;

BEST MODE FOR CARRYING OUT THE INVENTION

Hereinafter, a description is given of the embodiments of the invention with reference to the drawings.

(Embodiment 1)

Figure 1:
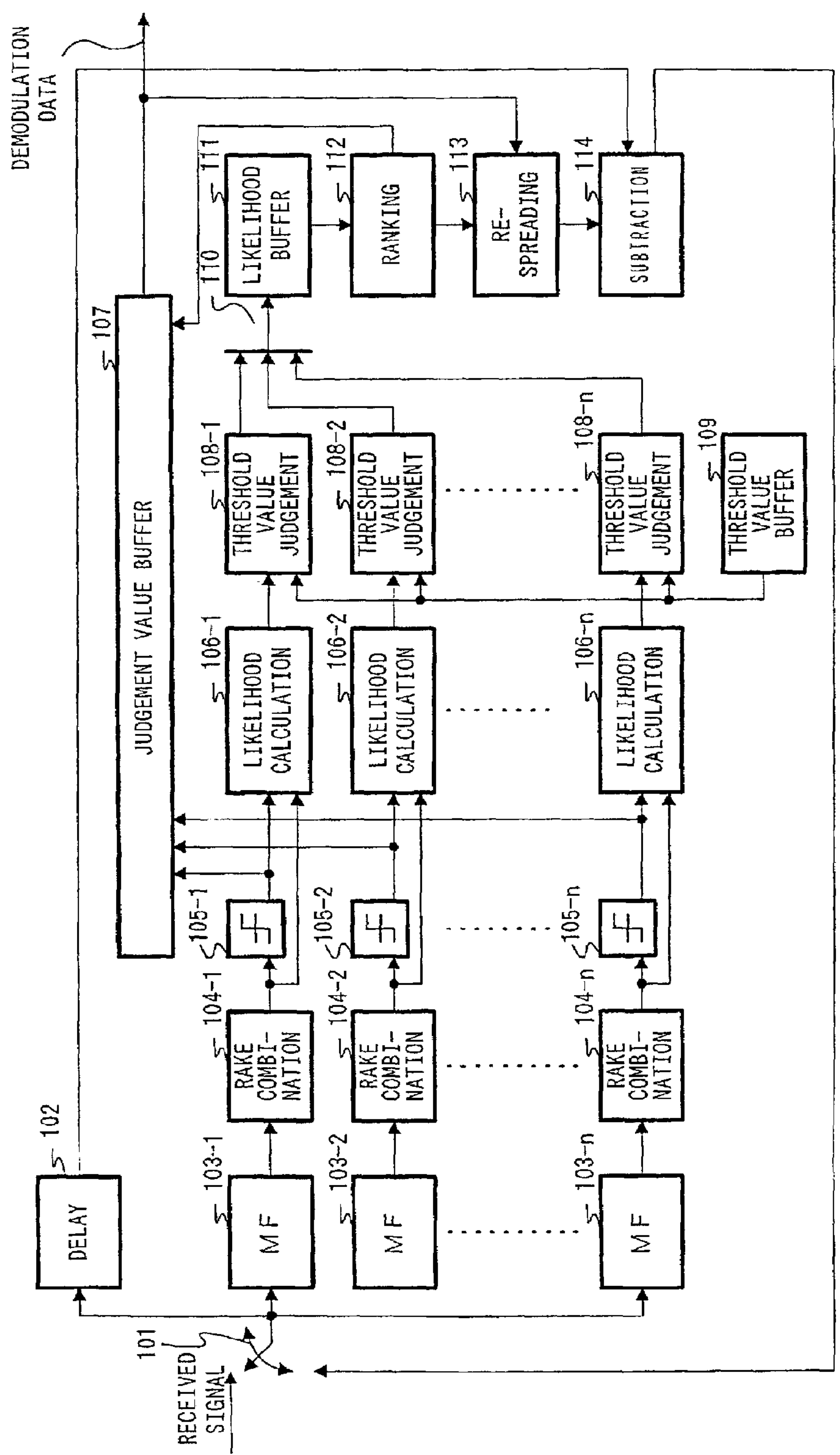
FIG. 1 is a block diagram showing a brief structure of an interference signal canceling apparatus according to a first embodiment of the invention.

FIG. 1 is a block diagram showing a brief structure of an interference signal canceling apparatus according to the first embodiment of the invention. In FIG. 1, received signals are signals that have been received through an antenna (not illustrated), and are those in which a plurality of user signals are combined in the same frequency band by the CDMA system.

Switch 101 selects either one of the received signals or signals that are outputted from a subtractor 114, and outputs the same to a delay unit 102 and matched filters 103-1 through **103-*n***.

The delay unit 102 delays signals, which are selected by the switch 101, by an appointed duration of time, and outputs the signals to the subtractor 114.

Respective matched filters 103-1 through **103-*n* take a correlation with spreading codes assigned user by user with respect to the input signals selected by the switch 101, suppress other user signals, which are signals other than signals for an appointed user, and thermal noise, and output signals, for which the correlation has been detected, to the corresponding RAKE combiners 104-1 through 104-*n***.

The respective RAKE combiners 104-1 through **104-*n* combines the signals in terms of RAKE, whose correlation is detected, symbol by symbol to improve the quality, and outputs the RAKE-combined signals to identifiers 105-1 through 105-*n* corresponding there to and probability calculator 106-1 through 106-*n*** corresponding thereto.

The respective identifiers 105-1 through **105-*n* carry out a hard decision for respective symbols with the RAKE-combined signals, and output signals after the hard decision to the corresponding probability calculators 106-1 through 106-***n* and judgement value buffer 107.

The respective probability calculators 106-1 through 106-*n* calculate the probability with respect to all symbols existing in a unit range (for example, one slot range) by using the RAKE-combined signals and hard-decided signals, that is, the signals after the hard decision, and output a signal showing the probability to threshold decision units 108-1 through 108-*n*. Herein, the probability is an index that expresses the certainty of a symbol, wherein the Euclidean distance, etc., of the hard-decided signals may be used.

A judgement value buffer 107 stores the hard-decided signals, output, as demodulated data, the hard-decided signals of the symbol having the highest probability on the basis of the signals outputted from a rank decision unit 112 described later, and output the same to a re-spreading unit 113.

The respective threshold value decision units 108-1 through 108-*n* judge the relationship in size between the calculated probability and the threshold value stored in the threshold value buffer 109, and the threshold value decision units output a signal showing the corresponding probability to a probability buffer 111 via a probability transmission bus 110 in only a case where the probability is the threshold value or more. The threshold value buffer 109 stores a threshold value used for decisions made by the respective threshold judging units 108-1 through 108-*n*.

The probability buffer 111 stores signals showing the probability. That is, only the probability exceeding an appointed threshold value.

The rank decision unit 112 carries out a ranking process with respect to the symbols, whose probability is an appointed threshold value or more, on the basis of the probability stored in the probability buffer 111, and outputs the signal showing the symbol having the highest probability to the judgement value buffer 107 and re-spreader 113.

The re-spreader 113 re-spreads the signals, which are outputted from the judgement value buffer 107, on the basis of the signal that is outputted from the rank decision unit 112, and outputs the re-spread signal to a subtractor 114.

The subtractor 114 subtracts the re-spread signal, which is outputted from the re-spreader 113, from the delayed received signal that is outputted from the delay unit 102, and outputs the subtracted signal to the switch 101 as the signal in which interference is canceled.

Herein, where the results of the hard decision made by the identifiers 105-1 through 105-*n* are correct, the output signal to the subtractor 114 becomes the symbol having the highest probability from the received signal and a signal in which interference due to the symbol is completely canceled.

Next, a description is given of actions of the interference signal canceling apparatus constructed as described above. First, using the received signals as input signals, all symbols existing in a unit range of the input signals are outputted to the delay unit 102 and matched filter 103-1 through 103-*n* via the switch 101.

The received signals that are inputted into the delay unit 102 are outputted into the subtractor 114 after they are delayed by an appointed duration of time.

On the other hand, the received signals that are inputted into the matched filter 103-1 through 103-*n* are correlated with spreading codes assigned user by user, and signals of other users, which are signals other than appointed signals, and signals from which thermal noise is suppressed, are picked up.

The signals picked up by the matched filter 103-1 through 103-*n* are, respectively, RAKE-combined by the RAKE combiners 104-1 through 104-*n*. The quality is further improved by performing the RAKE-combination. The signals that are RAKE-combined by the RAKE combiners 104-1 through 104-*n* are, respectively, outputted to the identifiers 105-1 through 105-*n* and probability calculators 106-1 through 106-*n*.

The signals that are inputted into the identifiers 105-1 through 105-*n* are hard-decided and outputted to the probability calculators 106-1 through 106-*n*.

The hard-decided signals are, respectively, outputted to the probability calculators 106-1 through 106-*n* and judgement value buffer 107. The hard-decided signals that are inputted into the judgement value buffer 107 are temporarily stored in the judgement value buffer 107.

On the other hand, the hard-decided signals that are outputted from the RAKE combiners 104-1 through 104-*n* and signals before hard decision, which are outputted from the identifiers 105-1 through 105-*n*, are inputted into the probability calculators 106-1 through 106-*n*, wherein the probability is calculated with respect to all symbols of the respective signals. The signals showing the probability are outputted to the respective threshold value decision units 108-1 through 108-*n*.

The respective threshold value judgement units 108-1 through 108-*n* compares the respective probability and the threshold values defined in advance in terms of size, wherein a signal showing the probability exceeding the threshold value is outputted to a probability buffer 111 via a probability transmission bus 110, and the probability is temporarily stored in the probability buffer 111.

And, a rank decision unit 112 carries out a ranking process on the basis of the probability stored in the probability buffer 111, and a signal showing the symbol having the highest probability is outputted to the judgement value buffer 107 and re-spreader 113.

A hard-decided signal of the symbol having the highest probability is outputted from the judgement value buffer 107 as the demodulated data, and the signal is outputted to the re-spreader 113.

In the re-spreader 113, a hard-decided signal of the symbol having the highest probability is re-spread by a spreading code that is similar to that at the transmission side and is outputted to the subtractor 114. In the subtractor 114, the signal that is re-spread by the re-spreader 113 is subtracted from the received signal that is delayed by the delay unit 102 and is outputted to the delay unit 102 and matched filters 103-1 through 103-*n* through the switch 101.

Thereafter, despreading, RAKE combination, hard decision and probability calculation are carried out for only the symbols that are interfered by the demodulated symbols, whereby non-demodulated and hard-decided signals from which interference due to the demodulated symbols are canceled are stored in the judgement value buffer 107. In other words, as regards the signals that are stored in the judgement value buffer 107, only the section corresponding to the symbols influenced by the symbols, which have been previously demodulated, of the hard-decided signals that have been stored in the judgement value buffer 107 the last time are renewed.

In the likelihood buffer 111, signals, in which the likelihood is the threshold value or more, of respective likelihood of non-demodulated signals from which interference due to the demodulated symbols is canceled, are stored. In other words, as regards the signals regarding the likelihood, which are stored in the likelihood buffer 111, only the section corresponding to the symbol, which is influenced by the previously demodulated symbols, of the signals regarding the likelihood, which are stored in the likelihood buffer 111, is renewed.

Thus, by carrying out a ranking process for only the symbols for which the likelihood exceeds an appointed threshold value, it is possible to relieve the traffic of a bus line and suppress the amount of processing in the ranking process, in the case where the number of users is increased and the transmission rate is increased.

Figure 2:
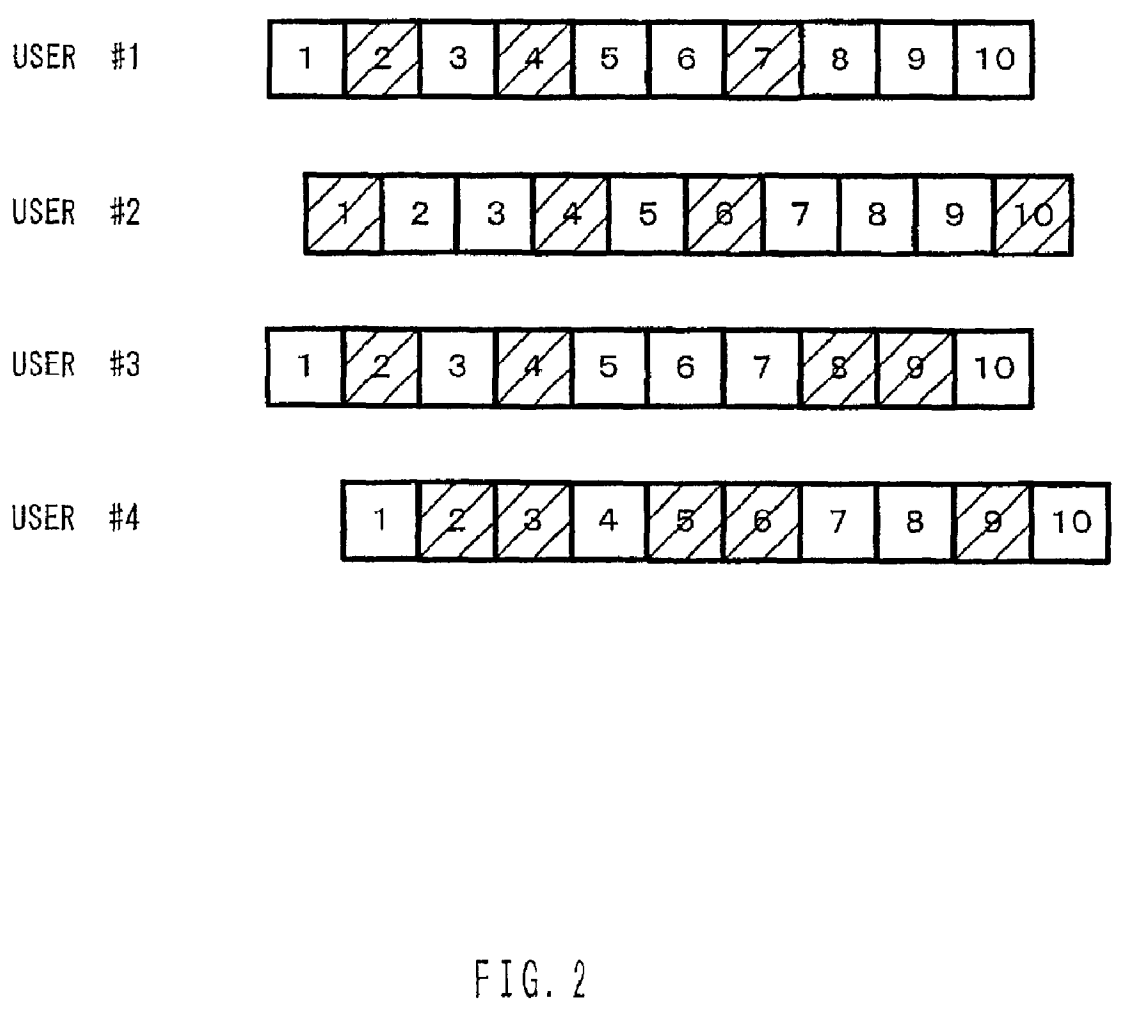

For example, as shown in FIG. 2, where it is assumed that the number of users is four, the number of symbols per slot is ten, and the symbols for which the likelihood exceeds the threshold value are sixteen symbols, which are obliquely lined, among the above, when no judgement of a threshold value is carried out, it is necessary that a ranking process is performed for all the forty symbols. However, if judgement of a threshold value is carried out, it is enough that the ranking process is carried out for only sixteen symbols for which the likelihood was the threshold value or more.

(Embodiment 2)

A second embodiment is a mode for adequately controlling the threshold value that is used for judgement of a threshold value. Hereinafter, a description is given of an interference signal canceling apparatus according to the second embodiment, using a block diagram in FIG. 3. Also, in an interference signal canceling apparatus shown in FIG. 3, components that are common to those of the interference signal canceling apparatus shown in FIG. 1 are given the same reference numbers, and overlapping description thereof is omitted.

Figure 3:
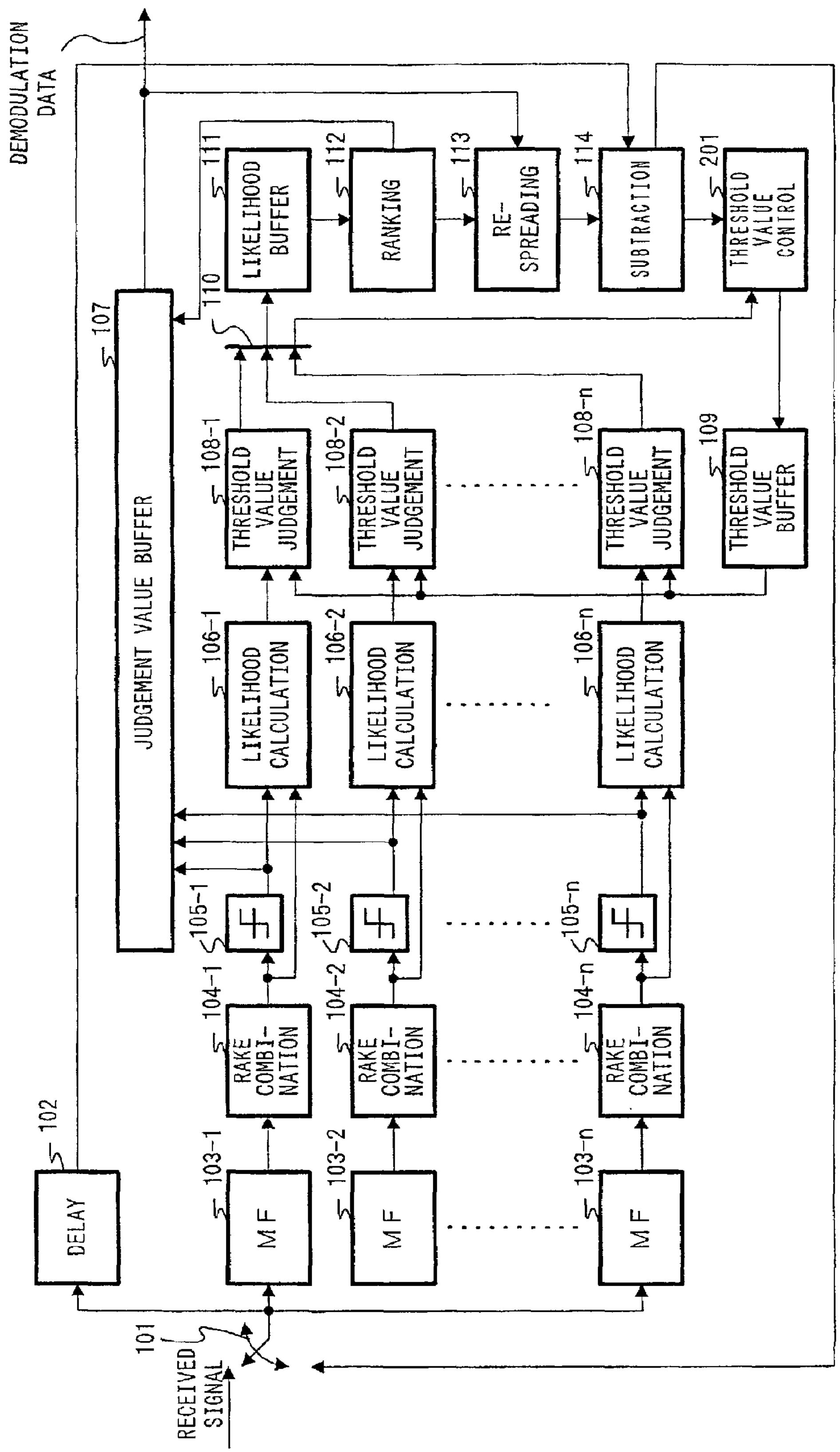
FIG. 3 is a block diagram showing a brief structure of an interference signal canceling apparatus according to a second embodiment of the invention.

The interference signal canceling apparatus shown in FIG. 3 is such that a threshold value controlling unit 201 is added to the interference signal canceling apparatus shown in FIG. 1.

The threshold value controlling unit 201 controls a threshold value, which is stored in the threshold value buffer on the basis of the number of likelihoods exceeding the threshold value, by inputting signals showing the likelihood being the threshold value or more, which are outputted from the respective threshold value judgement units 108-1 through **108-*n***.

For example, in the case where the number of likelihoods which is the threshold value or more is greater than the capacity or greater than the number that can be subjected to a ranking process in an appointed duration of time by a rank decision unit 112, the threshold value controlling unit 201 raises the corresponding threshold value and, in the next calculation, controls so as to reduce the number of likelihoods that becomes greater than the threshold value. Also, in the case where the number of likelihoods that is the threshold value or more is considerably lower than the capacity of the likelihood transmission bus 110 and is considerably lower than the number that can be subjected to a ranking process in an appointed duration of time by the rank decision unit 112, the threshold value controlling unit 201 lowers the corresponding threshold value and, in the next calculation, controls so as to increase the number of likelihoods that becomes the threshold value or more.

The threshold value buffer 109 first stores the threshold value established from outside and renews it based on the control of the threshold value section 201.

The respective threshold value judgement units 108-1 through **108-*n* compares the likelihood, which is calculated by the corresponding likelihood calculators 106-1 through 106-*n*, with the latest threshold value in terms of size, wherein, only where the likelihood is a threshold value or more, a signal showing the corresponding likelihood is outputted to the likelihood buffer 111 through the likelihood transmission bus 110 and is outputted to the threshold value decision unit 201**.

Thus, it is possible to place the number of likelihoods, for which a ranking process is carried out, within a fixed range by adequately altering the threshold value used for the judgement of the threshold value, and it is possible to suppress the amount of processing in the ranking process by relieving the traffic in a bus line.

Furthermore, in the present embodiment, a description was given of the case of controlling the threshold value on the basis of the number of likelihoods that were judged to be the threshold value or more in the last judgement of threshold value. However, the invention is not limited to this case, wherein the invention is applicable to a case of controlling the threshold value based on other methods in which a value which is lowered by an appointed value from the last established threshold value is made into a new threshold value.

(Embodiment 3)

However, where the first established threshold value is not adequate even in cases where the threshold value used for judgement of a threshold value is adequately altered as in the second embodiment, there remains such a problem in that it takes much time until the threshold value is controlled so as to become an adequate threshold value.

Herein, since there is no case where the line quality is radically changed between continuous slots, it is considered that a threshold value suitable for an interference signal canceling process in new slots is not greatly different from the threshold value used in the last slot.

A third embodiment is a mode to determine a threshold value used for an interference signal canceling process of a new slot with reference to the threshold value used last, in order to solve the above-described problem.

Hereinafter, a description is given of an interference signal canceling apparatus according to the third embodiment, using FIG. 4. Also, in an interference signal canceling apparatus shown in FIG. 4, components that are common to those of the interference signal canceling apparatus shown in FIG. 1 are given the same reference numbers, and overlapping description thereof is omitted.

Figure 4:
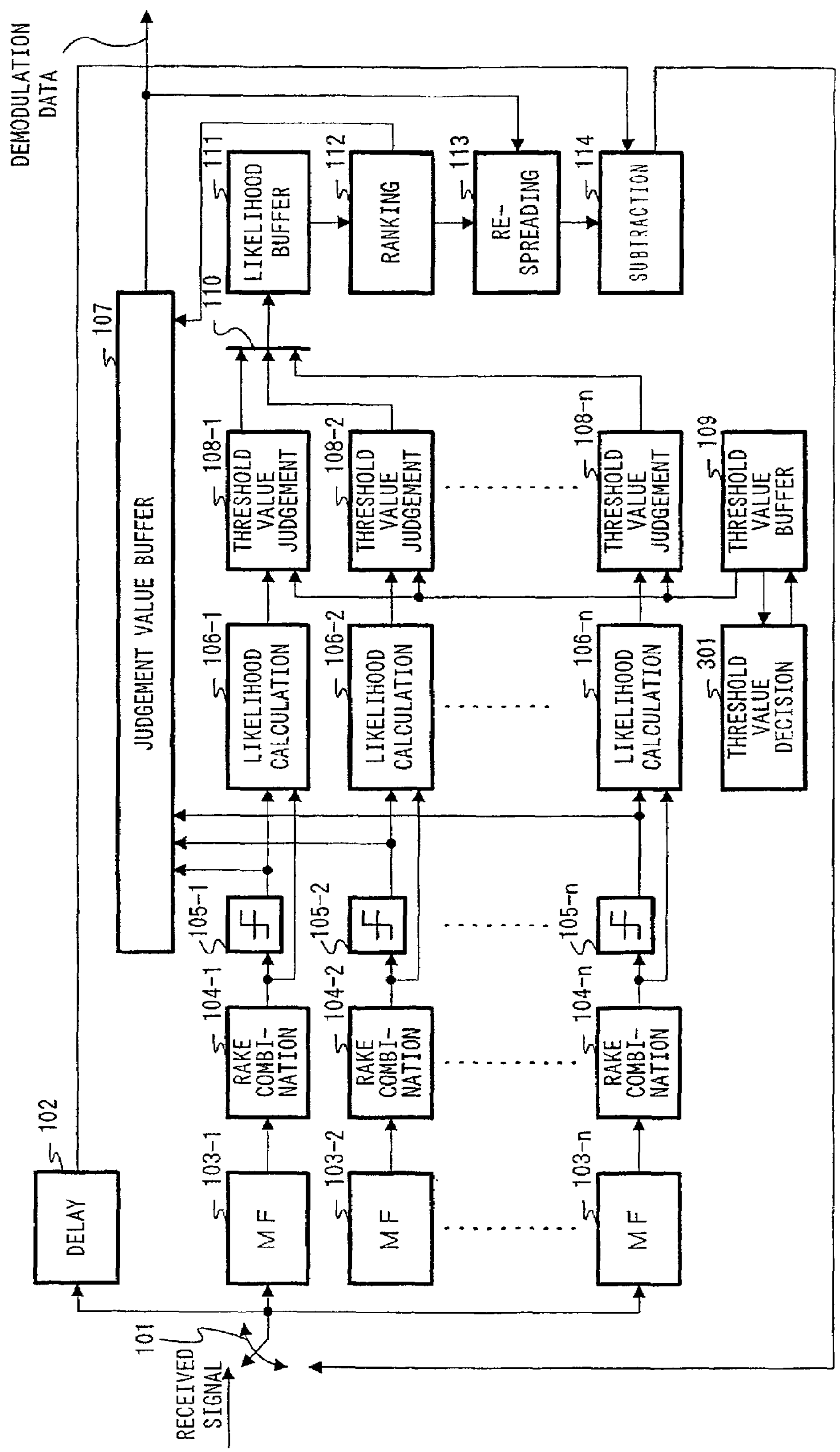
FIG. 4 is a block diagram showing a brief structure of an interference signal canceling apparatus according to a third embodiment of the invention.

The interference signal canceling apparatus shown in FIG. 4 employs such a structure in which a threshold value decision unit 301 is added to the interference signal canceling apparatus shown in FIG. 1.

The threshold value buffer 109 stores the threshold values used in the past.

The threshold value decision unit 301 decides a threshold value that is used for an interference signal canceling process this time on the basis of the threshold values used in the past. As methods for deciding the threshold values, a method for making the average value of threshold values in the past several times into the corresponding threshold value, and a method for deciding the corresponding threshold value from the ratio of changes in the threshold values used in the past are considered.

Thus, it is possible to carry out an interference signal canceling process using an adequate threshold value by deciding the threshold value to be used in an interference signal canceling process of a new slot with reference to the threshold values used in the previous slots.

Further, the third embodiment may be combined with the above-described first embodiment. That is, in a case where, with respect to the threshold value of the likelihood used in the first embodiment, there are a few symbols that exceed the threshold value in the previous slots, and there are a few objects to be ranked, the threshold value maybe lowered in the next slot. Contrarily, where there are many symbols that exceed the threshold value, and there are many objects to be ranked, the threshold value may be raised in the next slots.

Also, the third embodiment may be combined with the above-described second embodiment. That is, a threshold value controlling unit 201 is added to the interference signal canceling apparatus shown in FIG. 4, and the initial value of the threshold value is decided in the threshold value decision unit 301. Thereafter, it is possible to adequately control the threshold value in the threshold value controlling unit 201.

In addition, an interference signal canceling apparatus according to the invention may be incorporated in a base station of the CDMA wireless communication system.

Also, in the above-described respective embodiments, a description was given of the case where only a symbol having the highest likelihood is demodulated in a single ranking process. However, the invention is not limited to this. The invention is applicable to a case where a plurality of symbols are demodulated in a single ranking process.

As has been made clear in the above description, according to the interference signal canceling apparatus and method for canceling the same according to the invention, it is possible to relieve the traffic of a bus line and suppress the amount of processing in a ranking process even in a case where the number of users is increased and the transmission rate is increased.

This application is based on the Japanese Patent Application No. HEI-12-008973 filed on Jan. 18, 2000, entire content of which is expressly incorporated by reference herein.

INDUSTRIAL APPLICABILITY

The invention is preferably used for a base station for the CDMA mobile communication system.

What is claimed is:

1. An interference signal canceling apparatus, comprising:

likelihood calculating means for calculating likelihoods of respective symbols included in an input signal;

threshold value judging means for judging a threshold value by comparing a calculated likelihood with an appointed threshold value in terms of size;

rank deciding means for deciding the rank of symbols, in which said likelihood is said threshold value or more, on the basis of said likelihood;

demodulating means for demodulating said symbols on the basis of the decided rank; and removing means for removing the demodulated symbols from said input signal and making the same into a new input signal.

2. The interference signal canceling apparatus as set forth in claim 1, further comprising threshold value controlling means for controlling threshold values, wherein said threshold value judging means judges a threshold value using the threshold values that are controlled by said threshold value controlling means.

3. The interference signal canceling apparatus as set forth in claim 2, wherein said threshold value controlling means controls threshold values on the basis of the numbers of likelihoods that are judged to be the threshold value or more.

4. The interference signal canceling apparatus as set forth in claim 1, further comprising threshold value deciding means for deciding a threshold value on the basis of the threshold values used in the past, wherein said threshold value judging means carries out a first-time judgement of threshold values, using the threshold value that is decided by said threshold value deciding means.

5. A base station having an interference signal canceling apparatus, wherein said interference signal canceling apparatus comprises likelihood calculating means for calculating likelihoods of respective symbols included in an input signal; threshold value judging means for judging a threshold value by comparing a calculated likelihood with an appointed threshold value in terms of size; rank deciding means for deciding the rank of symbols, in which said likelihood is said threshold value or more, on the basis of said likelihood; demodulating means for demodulating said symbols on the basis of the decided rank; and removing means for removing the demodulated symbols from said input signal and making the same into a new input signal.

6. A method for canceling an interference signal, comprising the steps of:

calculating likelihoods of respective symbols included in input signals;

selecting symbols in which said calculated likelihood is a threshold value or more;

deciding a rank of said selected symbols in the order that said likelihood is higher;

demodulating said symbols on the basis of said decided rank; and removing said demodulated symbols from said input signal, and making the same into a new input signal.

* * * * *